(12) United States Patent
Huang-Fu et al.

(10) Patent No.: US 12,010,552 B2
(45) Date of Patent: Jun. 11, 2024

(54) ENHANCEMENTS ON 5G SESSION MANAGEMENT (5GSM) HANDLING OF NETWORK REJECTION NOT DUE TO CONGESTION CONTROL

(71) Applicant: MEDIATEK INC., Hsinchu (TW)

(72) Inventors: Chien-Chun Huang-Fu, Hsinchu (TW); Bo-Hun Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 122 days.

(21) Appl. No.: 17/548,675

(22) Filed: Dec. 13, 2021

(65) Prior Publication Data
US 2022/0256401 A1  Aug. 11, 2022

Related U.S. Application Data

(60) Provisional application No. 63/146,741, filed on Feb. 8, 2021.

(51) Int. Cl.
*H04W 76/30* (2018.01)
*H04W 28/08* (2023.01)
*H04W 84/04* (2009.01)

(52) U.S. Cl.
CPC ....... *H04W 28/0908* (2020.05); *H04W 76/30* (2018.02); *H04W 84/042* (2013.01)

(58) Field of Classification Search
CPC . H04W 76/30; H04W 76/18; H04W 28/0908; H04W 48/18; H04W 48/16; H04W 24/02; H04W 72/20
See application file for complete search history.

(56) References Cited

U.S. PATENT DOCUMENTS

| | | | |
|---|---|---|---|
| 2022/0264683 A1* | 8/2022 | Liu | H04W 48/16 |
| 2023/0156584 A1* | 5/2023 | Choi | H04W 48/18 |
| | | | 370/329 |

OTHER PUBLICATIONS

Chinese language office action dated Oct. 26, 2022, issued in application No. TW 110149028.
3rd Generation Partnership Project; "3GPP TS 24.501 V17.1.0; 3rd Generation Partnership Project; Technical Specification Group Core Network and Terminals; Non-Access-Stratum (NAS) protocol for 5G System (5GS); Stage 3; (Release 17);" Dec. 2020; pp. 1-746.

* cited by examiner

*Primary Examiner* — Anez C Ebrahim
(74) *Attorney, Agent, or Firm* — McClure, Qualey & Rodack, LLP

(57) ABSTRACT

A method for 5G Session Management (5GSM) handling of network rejection not due to congestion control is provided. A User Equipment (UE) receives a 5GSM reject message from a mobile communication network. The 5GSM reject message indicates a network rejection not due to congestion control. The UE associates a back-off timer with a Home Public Land Mobile Network (HPLMN) Single-Network Slice Selection Assistance Information (S-NSSAI). The UE prevents itself from sending a 5GSM request message for the same HPLMN S-NSSAI that is associated with the back-off timer.

20 Claims, 5 Drawing Sheets

ENHANCEMENTS ON 5G SESSION MANAGEMENT (5GSM) HANDLING OF NETWORK REJECTION NOT DUE TO CONGESTION CONTROL

CROSS REFERENCE TO RELATED APPLICATIONS

This application claims priority under 35 U.S.C. § 119 from U.S. Provisional Application No. 63/146,741, entitled "Handlings of 5GSM causes not due to congestion control", filed on Feb. 8, 2021, the subject matter of which is incorporated herein by reference.

BACKGROUND OF THE APPLICATION

Field of the Application

The application generally relates to mobile communications, and more particularly, to enhancements on 5G Session Management (5GSM) handling of network rejection not due to congestion control.

Description of the Related Art

In a typical mobile communication environment, a UE (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the 3rd Generation Partnership Project (3GPP). It is designed to better support mobile broadband Internet access by improving spectral efficiency, reducing costs, and improving services.

According to the 3rd Generation Partnership Project (3GPP) specifications and/or requirements in compliance with the 5G NR technology, a UE, which is rejected not due to congestion control during a 5GSM procedure, should be prevented from sending the same 5GSM request message again in an Equivalent PLMN (EPLMN) when re-attempt in EPLMN is not allowed. However, the back-off timer facilitating the re-attempt prevention mechanism is wrongly associated with the complete Single-Network Slice Selection Assistance Information (S-NSSAI), causing the re-attempt prevention mechanism to fail. For example, in cases where the back-off timer is started in a Home PLMN (HPLMN) and then the UE moves from the HPLMN to a Visited PLMN (VPLMN) in the EPLMN list, the UE will not be prevented (as it should be) from sending the same 5GSM request message in the VPLMN because the S-NSSAI of an active Protocol Data Unit (PDU) session may be updated after the inter-PLMN change. To clarify further, a complete S-NSSAI may consist of a serving part and a mapped part. When the UE was registered in the HPLMN and established a PDU session, the complete S-NSSAI associated with the PDU session may be in format-1: [serving (H)PLMN S-NSSAI, null]. After the inter-PLMN change, the complete S-NSSAI associated with the same PDU session may be updated to format-2: [serving (V)PLMN S-NSSAI, mapped (H)PLMN S-NSSAI]. Consequently, the re-attempt prevention mechanism may fail because of that the complete S-NSSAI has been updated to format-2 after the inter-PLMN change but the back-off timer is still associated with the outdated S-NSSAI in format-1. In addition, the same problem exists in other inter-PLMN change scenarios as well, including the UE moving from VPLMN1 to VPLMN2, and the UE moving from VPLMN to HPLMN.

BRIEF SUMMARY OF THE APPLICATION

In order to solve the aforementioned problem, the present application proposes that the UE, which is rejected not due to congestion control during a 5GSM procedure, should associate the back-off timer with the (mapped) HPLMN S-NSSAI, instead of the complete S-NSSAI. Advantageously, the robust association may keep the UE from sending the same 5GSM request message again in an EPLMM (when re-attempt in EPLMN is not allowed). Moreover, for some of the rejection causes not related to congestion control, the UE should ignore the back-off timer value included in the 5GSM reject message according to the 3GPP specifications, and thus, the present application proposes that the UE should keep track of the (mapped) HPLMN S-NSSAI associated with the previously sent 5GSM request message, so as to prevent itself from sending another 5GSM request message for the same (mapped) HPLMN S-NSSAI.

In one aspect of the application, a method is provided. The method comprises the following steps: receiving a 5GSM reject message from a mobile communication network by a UE, wherein the 5GSM reject message indicates a network rejection not due to congestion control; associating a back-off timer with a HPLMN S-NSSAI; and preventing the UE from sending a 5GSM request message for the same HPLMN S-NSSAI that is associated with the back-off timer.

In one example, the 5GSM reject message is associated with a PDU session, and the HPLMN S-NSSAI is obtained from a serving part of an S-NSSAI associated with the PDU session when the UE is registered in a HPLMN. The serving part comprises the HPLMN S-NSSAI, and the S-NSSAI further comprises a mapped part which is set to null.

In one example, the 5GSM reject message is associated with a PDU session, and the HPLMN S-NSSAI is obtained from a mapped part of an S-NSSAI associated with the PDU session when the UE is registered in a VPLMN. The mapped part comprises the HPLMN S-NSSAI, and the S-NSSAI further comprises a serving part which comprises a VPLMN S-NSSAI.

In one example, the 5G-SM reject message is received when the UE is registered in a first PLMN, and the preventing of the UE from sending a 5GSM request message for the same HPLMN S-NSSAI is performed when the UE is registered in a second PLMN. The first PLMN and the second PLMN are a HPLMN and one VPLMN in an EPLMN list, respectively, or are one VPLMN in the EPLMN list and the HPLMN, respectively, or are a first VPLMN and a second VPLMN which is in an EPLMN list of the first VPLMN, respectively. The 5GSM reject message may comprise a re-attempt indicator which indicates that re-attempt in an EPLMN is not allowed, or the 5GSM reject message may not comprise a re-attempt indicator.

In another aspect of the application, a method is provided. The method comprises the following steps: sending a 5GSM request message to a mobile communication network by a UE, wherein the 5GSM request message is associated with a HPLMN S-NSSAI; receiving a 5GSM reject message from the mobile communication network, wherein the 5GSM reject message indicates a network rejection not due to congestion control; and preventing the UE from sending another 5GSM request message for the same HPLMN S-NSSAI in response to the 5GSM reject message.

In one example, in response to the 5GSM reject message comprising a 5GSM cause value of #50 "PDU session type IPv4 only allowed", #51 "PDU session type IPv6 only allowed", #57 "PDU session type IPv4v6 only allowed", #58 "PDU session type Unstructured only allowed", or #61 "PDU session type Ethernet only allowed", the UE prevents itself from sending another 5GSM request message for the same HPLMN S-NSSAI until any of the following conditions is fulfilled: (1) the UE is registered to a new PLMN which was not in a list of equivalent PLMNs at the time when the 5GSM reject message was received; (2) the UE is registered to a new PLMN which was in a list of equivalent PLMNs at the time when the 5GSM reject message was received, and either the 5GSM reject message does not include a re-attempt indicator or the re-attempt indicator included in the 5GSM reject message indicates that re-attempt in an equivalent PLMN is allowed; (3) a PDU session type which is used to access to the HPLMN S-NSSAI is changed by the UE which subsequently requests a new PDU session type; (4) the UE is switched off; and (5) a Universal Subscriber Identity Module (USIM) is removed or an entry in a list of subscriber data for a current Standalone Non-Public Network (SNPN) is updated.

In one example, in response to the 5GSM reject message comprising a 5GSM cause value of #68 "not supported SSC mode", the UE prevents itself from sending another 5GSM request message for the same HPLMN S-NSSAI until any of the following conditions is fulfilled: (1) the UE is registered to a new PLMN which was not in a list of equivalent PLMNs at the time when the 5GSM reject message was received; (2) a Session and Service Continuity (SSC) mode which is used to access to the DNN and the HPLMN S-NSSAI is changed by the UE which subsequently requests a new SSC mode or no SSC mode; (3) the UE is switched off; and (4) a USIM is removed or an entry in a list of subscriber data for a current SNPN is updated.

In one example, the 5GSM reject message is a PDU SESSION ESTABLISHMENT REJECT message or a PDU SESSION MODIFICATION REJECT message, and the 5GSM request message is a PDU SESSION ESTABLISHMENT REQUEST message or a PDU SESSION MODIFICATION REQUEST message.

Other aspects and features of the present application will become apparent to those with ordinary skill in the art upon review of the following descriptions of specific embodiments of the methods and UEs for 5GSM handling of network rejection not due to congestion control.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
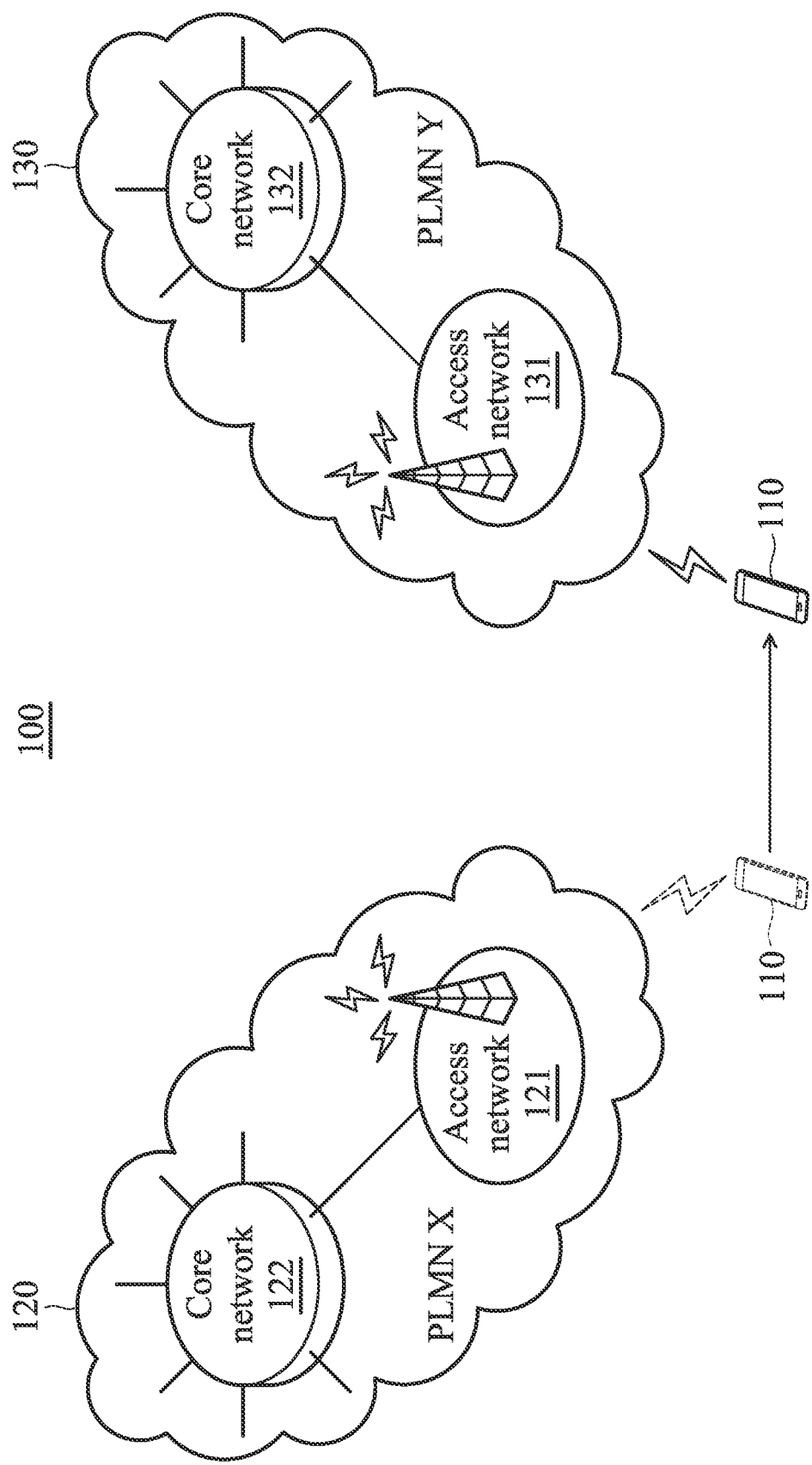
FIG. 1 is a block diagram of a mobile communication environment according to an embodiment of the application.

FIG. 1 is a block diagram of a mobile communication environment according to an embodiment of the application.

The mobile communication environment 100 may include a User Equipment (UE) 110 and two mobile communication networks 120 and 130, wherein the mobile communication networks 120 and 130 belong to different PLMNs, and the UE 110 may move among the PLMNs to which the mobile communication networks 120 and 130 belong. That is, the UE 110 may selectively connect to the mobile communication network 120 or 130 for obtaining mobile services.

The UE 110 may be a feature phone, a smartphone, a panel Personal Computer (PC), a laptop computer, or any wireless communication device supporting the RATs utilized by the mobile communication networks 120 and 130.

The mobile communication network 120 may include an access network 121 and a core network 122, while the mobile communication network 130 may include an access network 131 and a core network 132. The access networks 121 and 131 are responsible for processing radio signals, terminating radio protocols, and connecting the UE 110 with the core networks 122 and 132, respectively. The core networks 122 and 132 are responsible for performing mobility management, network-side authentication, and interfaces with public/external networks (e.g., the Internet). The access networks 121 and 131 and the core networks 122 and 132 may each comprise one or more network nodes for carrying out said functions.

For example, each of the mobile communication networks 120 and 130 may be a 5G NR network, and the access network 121/131 and the core network 122/132 may be a Next Generation Radio Access Network (NG-RAN) and a Next Generation Core Network (NG-CN), respectively.

An NG-RAN may include one or more cellular stations, such as next generation NodeBs (gNBs), which support high frequency bands (e.g., above 24 GHz), and each gNB may further include one or more Transmission Reception Points (TRPs). Some gNB functions may be distributed across different TRPs, while others may be centralized, leaving the flexibility and scope of specific deployments to fulfill the requirements for specific cases.

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data. Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

As shown in FIG. 1, the UE 110 may first register to PLMN X to which the mobile communication network 120 belongs, and then request establishment or modification of a PDU session in PLMN X. After that, the UE 110 may move to (i.e., register to) PLMN Y to which the mobile communication network 130 belongs. In accordance with one novel aspect, the UE 110 associates the back-off timer with the (mapped) HPLMN S-NSSAI when the PDU session establishment/modification request in PLMN X is rejected not due to congestion control and re-attempt in an EPLMN is not allowed, and prevents itself from sending another 5GSM request message for the same Data Network Name (DNN) and the same (mapped) HPLMN S-NSSAI in the current PLMN (e.g., PLMN Y). Advantageously, no matter how the UE 110 may move among different PLMNs, the back-off timer will remain associated with the same S-NSSAI, allowing the re-attempt prevention mechanism to function successfully.

Figure 2:
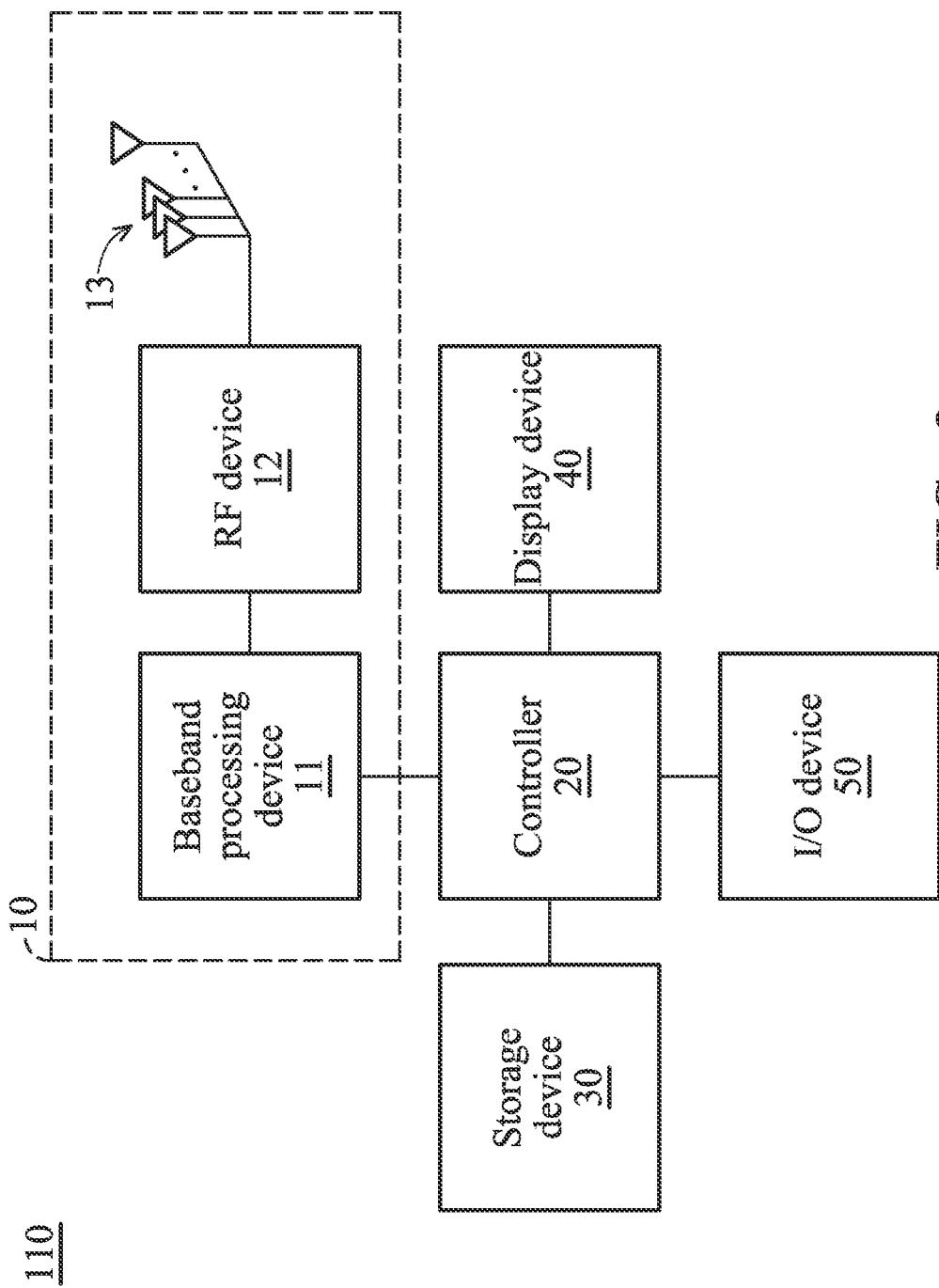
FIG. 2 is a block diagram illustrating a UE according to an embodiment of the application.

FIG. 2 is a block diagram illustrating a UE according to an embodiment of the application.

As Shown in FIG. 2, a UE (e.g., the UE 110) may include a wireless transceiver 10, a controller 20, a storage device 30, a display device 40, and an Input/Output (I/O) device 50.

The wireless transceiver 10 is configured to perform wireless transmission and reception to and from the mobile communication network 120. Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between a subscriber identity card (not shown) and the RF device 12. The subscriber identity card may be a Subscriber Identity Module (SIM) card or a Universal SIM (USIM) card, depending on the RAT utilized by the mobile communication network 120/130. Alternatively, the subscriber identity card may be a programmable SIM/USIM (e.g., eSIM/eUSIM) that is embedded directly into the UE. The baseband processing device 11 may contain multiple hard components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the mobile communication network 120, storing and retrieving data (e.g., the HPLMN, VPLMN, and EPLMN list) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 to perform the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a SIM/SIM, a memory, such as a FLASH memory or a Non-Volatile Random Access Memo (NVRAM), or a magnetic storage device, such as a hard disk or a magnetic tape, or an optical disc, or any combination thereof for storing data (e.g., the HPLMN, VPLMN, and EPLMN list), instructions, and/or program code of applications, communication protocols, and/or the method of the present application. In one example, the method of the present application may be implemented as part of a communication protocol, such as a 5G NR protocol stack, which includes a Non-Access-Stratum (NAS) layer to communicate with an AMF/SMF entity in the core network 122/132, a Radio Resource Control (RRC) layer for high layer configuration and control, a Packet Data Convergence Protocol/Radio Link Control (PDCP/RLC) layer, a Media Access Control (MAC) layer, and a Physical (PHY) layer.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components if necessary, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components if necessary. For example, a UE may not include the display device 40 and/or the I/O device 50.

Figure 3:
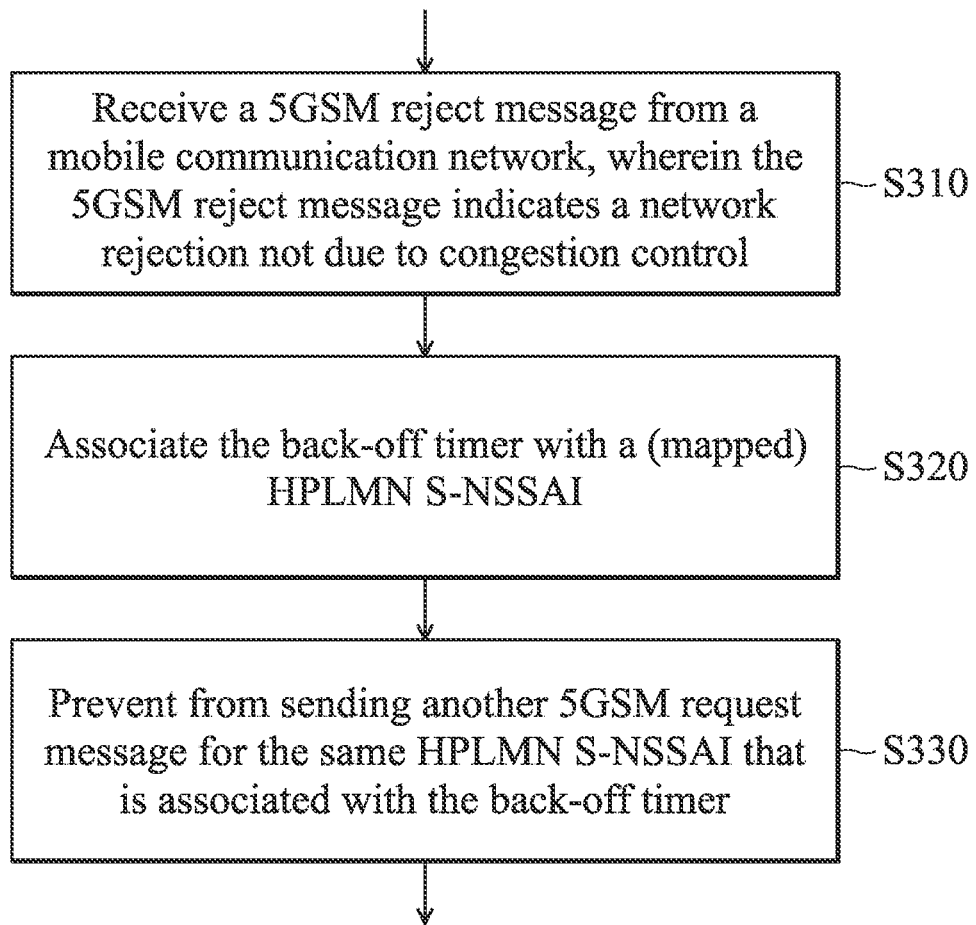
FIG. 3 is a flow chart illustrating the method for 5GSM handling of network rejection not due to congestion control according to an embodiment of the application.

FIG. 3 is a flow chart illustrating the method for 5GSM handling of network rejection not due to congestion control according to an embodiment of the application.

In this embodiment, the method for 5GSM handling of network rejection not due to congestion control may be applied to and executed by a UE (e.g., the UE 110) wirelessly and communicatively connected to a mobile communication network (e.g., the mobile communication network 120/130).

To begin the UE receives a 5GSM reject message from a mobile communication network, wherein the 5GSM reject message indicates a network rejection not due to congestion control (step S310).

Specifically, the UE may have sent a 5GSM request message prior to receiving the 5GSM reject message, and the 5GSM reject message may include a 5GSM cause value indicating the reason why the 5GSM request is rejected by the network.

In one example, the 5GSM request message is a PDU SESSION ESTABLISHMENT REQUEST message, and the 5GSM reject message is a PDU SESSION ESTABLISHMENT REJECT message. In another example, the 5GSM request message is a PDU SESSION MODIFICATION REQUEST message, and the 5GSM reject message is a PDU SESSION MODIFICATION REJECT message.

Next, the UE associates the back-off timer with a (mapped) HPLMN S-NSSAI (step S320).

If the back-off timer was provided during a PDU session establishment procedure, the UE should behave as follows: when the UE is registered in a HPLMN, the DNN and the S-NSSAI of the [PLMN, DNN, S-NSSAI] combination associated with the back-off timer is the DNN and the S-NSSAI provided by the UE when the PDU session is established. When the UE is registered in a VPLMN, the DNN and the S-NSSAI of the [PLMN, DNN, S-NSSAI] combination associated with the back-off timer is the DNN and the mapped S-NSSAI provided by the UE when the PDU session is established.

If the back-off timer was provided during the PDU session modification procedure, the UE behaves as follows: the DNN associated with the back-off timer is the DNN, including no DNN, provided by the UE when the PDU session is established. If an S-NSSAI was provided by the UE during the PDU session establishment, when the UE is registered in a HPLMN, then the S-NSSAI associated with the back-off timer is the S-NSSAI of the PDU session. If an S-NSSAI was provided by the UE during the PDU session establishment, when the UE is registered in a VPLMN, then the S-NSSAI associated with the back-off timer is the mapped S-NSSAI of the PDU session.

That is, the 5GSM reject message is associated with a PDU session. In one example, the HPLMN S-NSSAI is obtained from a serving part of an S-NSSAI associated with the PDU session when the UE is registered in a HPLMN, wherein the serving part includes the HPLMN S-NSSAI and the mapped part of the S-NSSAI is set to null. In another example, the HPLMN S-NSSAI is obtained from a mapped part of an S-NSSAI associated with the PDU session when the UE is registered in a VPLMN, wherein the mapped part includes the HPLMN S-NSSAI, and the serving part of the S-NSSAI includes a VPLMN S-NSSAI.

After that, the UE prevents itself from sending another 5GSM request message for the same HPLMN S-NSSAI that is associated with the back-off timer (step S330).

In one example, the 5GSM reject message is received when the UE is registered in a first PLMN, and the preventing of the UE from sending a 5GSM request message for the same HPLMN S-NSSAI is performed when the UE is registered in a second PLMN. Specifically, the first PLMN and the second PLMN may be a HPLMN and one VPLMN in the EPLMN list, respectively; or the first PLMN and the second PLMN may be one VPLMN in the EPLMN list and the HPLMN, respectively; or the first PLMN and the second PLMN may be a first VPLMN and a second VPLMN which is in the EPLMN list of the first VPLMN.

That is, if the UE is registered in the HPLMN the UE should check on the serving HPLMN S-NSSAI to see if it matches the HPLMN S-NSSAI that is associated with the back-off timer. Otherwise, if the UE is registered in a VPLMN, the UE should check on the mapped HPLMN S-NSSAI to see if it matches the HPLMN S-NSSAI that is associated with the back-off timer. If the check result indicates a match, then the UE should not send another 5GSM request message with the same configurations (e.g., the same PDU session type or the same SSC mode) for the same HPLMN S-NSSAI.

Please note that although the method as described in FIG. 3 provides a general guidance for the UE to handle the network rejection not due to congestion control, there are some of the rejection causes not related to congestion control (such as 5GSM cause #50, #51, #57, #58, #61, or #68) may mandate the UE to ignore the back-off timer value included in the 5GSM reject message. In this case, the hack-off timer will not be started and there will be no association of the back-off timer with the (mapped) HPLMN S-NSSAI. Therefore, as depicted in the following figures, the present application proposes that the UE should keep track of the (mapped) HPLMN S-NSSAI associated with the previously sent 5GSM request message, so as to prevent itself from sending another 5GSM request message for the same (mapped) HPLMN S-NSSAI.

Figure 4:
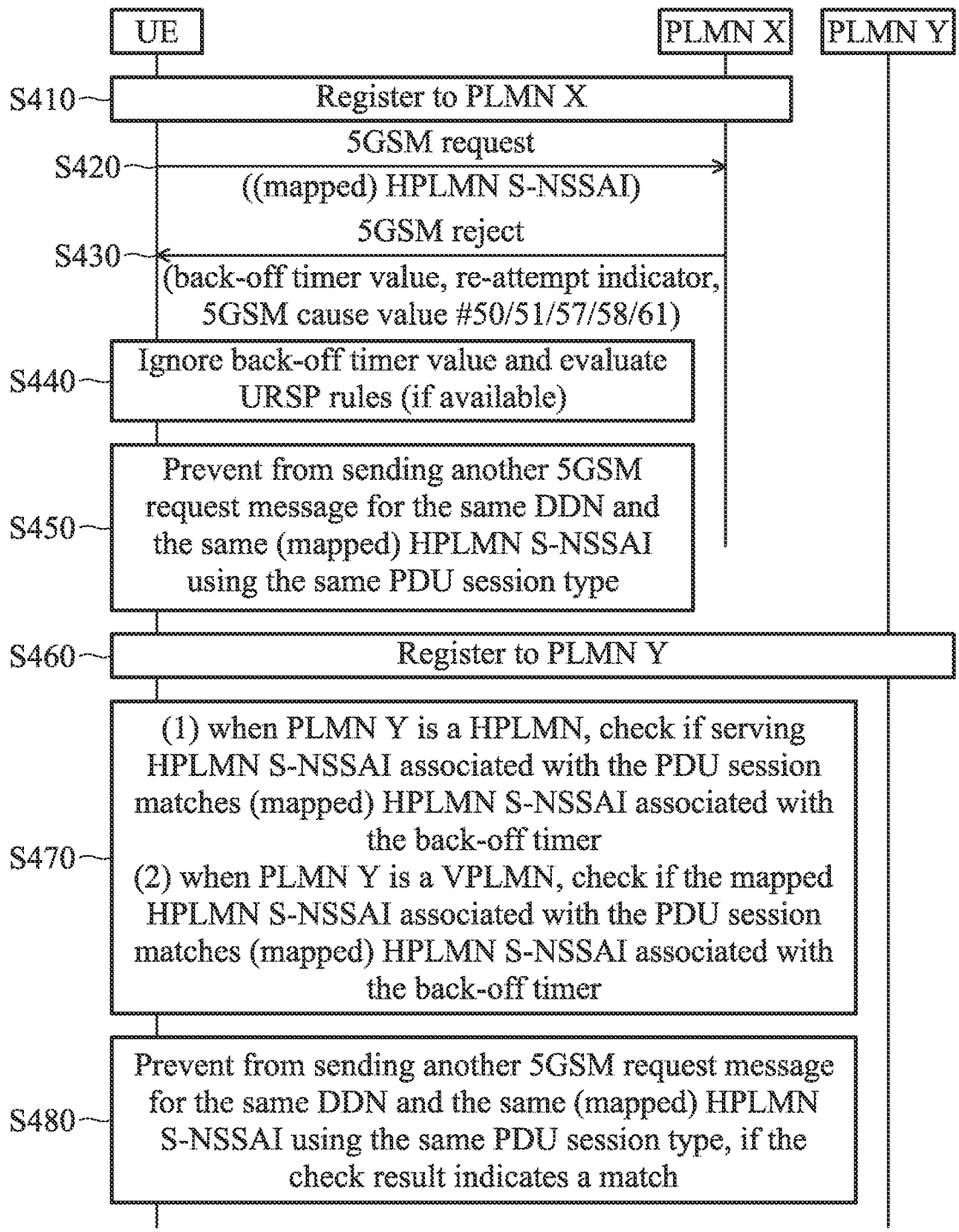
FIG. 4 is a message sequence chart illustrating the 5GSM handling of network rejection not due to congestion control according to an embodiment of the application.

FIG. 4 is a message sequence chart illustrating the 5GSM handling of network rejection not due to congestion control according to an embodiment of the application.

In step S410, the UE registers to PLMN X.

In step S420, the UE sends a 5GSM request (e.g., PDU SESSION ESTABLISHMENT/MODIFICATION REQUEST) message to PLMN X, wherein the 5GSM request message includes a (mapped) HPLMN S-NSSAI (e.g., when the 5GSM request is a PDU SESSION ESTABLISHMENT REQUEST) or is associated with a (mapped) HPLMN S-NSSAI of the PDU session (e.g., when the 5GSM request is a PDU SESSION MODIFICATION REQUEST). Specifically, the HPLMN S-NSSAI included in the 5GSM request message or associated with the PDU session is a serving HPLMN S-NSSAI if PLMN X is a HPLMN, or is a mapped HPLMN S-NSSAI if PLMN X is a VPLMN.

In step S430, the UE receives a 5GSM reject message (e.g., PDU SESSION ESTABLISHMENT/MODIFICATION REJECT) from PLMN X, wherein the 5GSM reject message includes a back-off timer value, a re-attempt indicator which indicates that re-attempt in EPLMN is not allowed, and a 5GSM cause value=#50 "PDU session type IPv4 only allowed", #51 "PDU session type IPv6 only allowed", #57 "PDU session type IPv4v6 only allowed", #58 "PDU session type Unstructured only allowed", or #61 "PDU session type Ethernet only allowed".

In step S440, the UE ignores the back-off timer value and evaluates the UE route selection policy (URSP) rules (if available).

In step S450, the UE prevents itself from sending another 5GSM request message for the same DDN and the same (mapped) HPLMN S-NSSAI using the same PDU session type until any of the following conditions is fulfilled: (1) the UE is registered to a new PLMN which was not in a list of equivalent PLMNs at the time when the 5GSM reject message was received; (2) the UE is registered to a new PLMN which was in a list of equivalent PLMNs at the time when the 5GSM reject message was received, and either the 5GSM reject message does not include a re-attempt indicator or the re-attempt indicator included in the 5GSM reject message indicates that re-attempt in an equivalent PLMN is allowed; (3) a PDU session type which is used to access to the HPLMN S-NSSAI is changed by the UE which subsequently requests a new PDU session type; (4) the UE is switched off, and (5) a USIM is removed or an entry in a list of subscriber data for a current Stand-alone Non-Public Network (SNPN) is updated.

In step S460, the UE moves from PLMN X to PLMN Y and registers to PLMN Y which is in the EPLMN list at the time when the 5GSM reject message was received.

In step S470, the UE checks the following based on the determination of PLMN Y is a HPLMN or a VPLMN. The checking includes: (1) when PLMN Y is a HPLMN, check if the serving HPLMN S-NSSAI included in the 5GSM request message or associated with the PDU session matches the (mapped) S-NSSAI associated with the back-off timer; (2) when PLM Y is a VPLMN, check if the mapped HPLMN S-NSSAI included in the 5GSM request message or associated with the PDU session matches the (mapped) HPLMN S-NSSAI associated with the back-off timer.

In step S480, if the check result indicates a match, the UE prevents itself from sending another 5GSM request message for the same DDN and the same (mapped) HPLMN S-NSSAI using the same PDU session type until any of the conditions described in step S450 is fulfilled.

Figure 5:
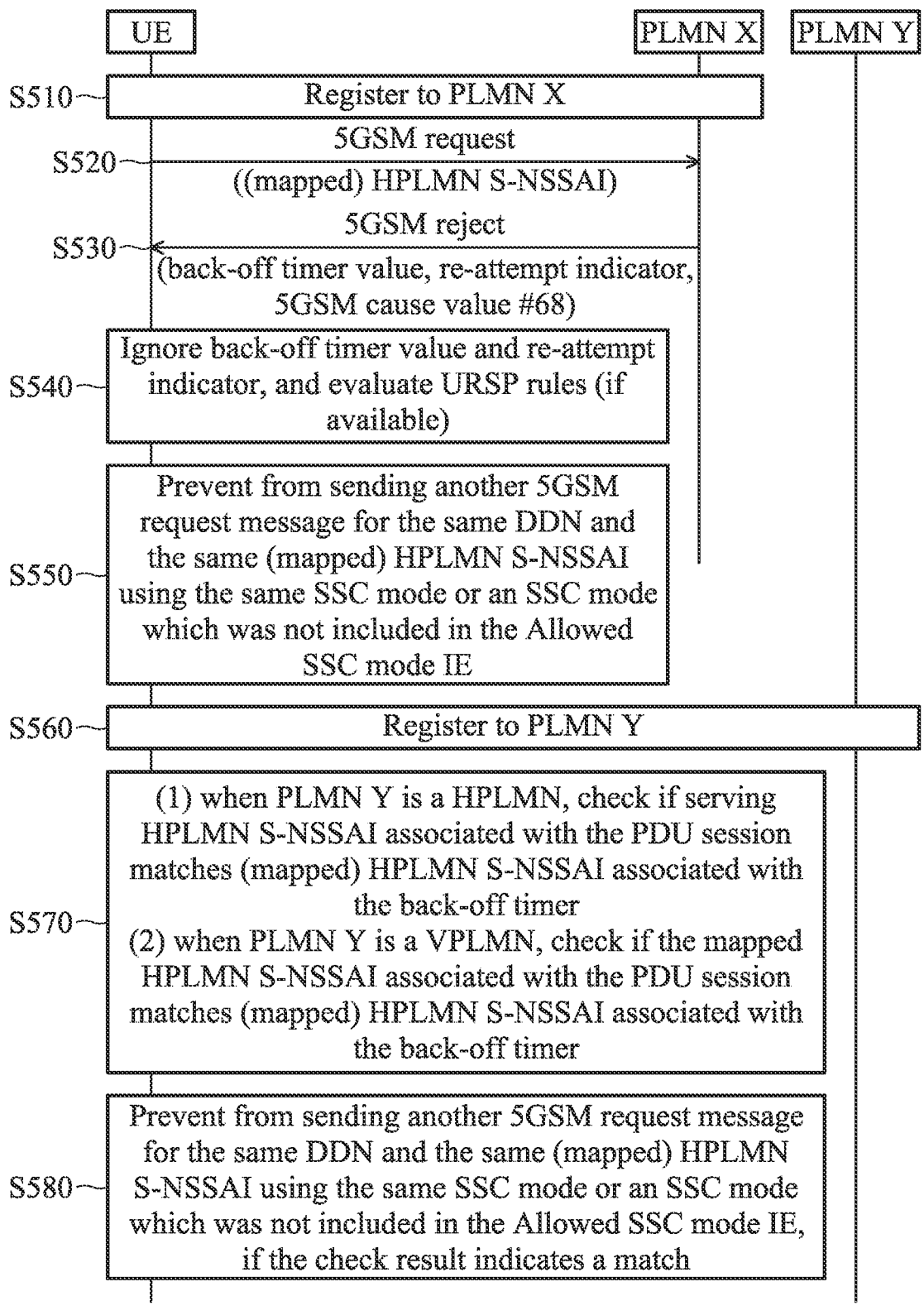
FIG. 5 is a message sequence chart illustrating the 5GSM handling of network rejection not due to congestion control according to another embodiment of the application.

FIG. 5 is a message sequence chart illustrating the 5GSM handling of network rejection not due to congestion control according to another embodiment of the application.

In step S510, the UE registers to PLMN X.

In step S520, the UE sends a 5GSM request (e.g., PDU SESSION ESTABLISHMENT/MODIFICATION REQUEST) message to PLMN X, wherein the 5GSM request message includes a (mapped) HPLMN S-NSSAI (e.g., when the 5GSM request is a PDU SESSION ESTABLISHMENT REQUEST) or is associated with a (mapped) HPLMN S-NSSAI of the PDU session (e.g., when the 5GSM request is a PDU SESSION MODIFICATION REQUEST). Specifically, the HPLMN S-NSSAI included in the 5GSM request message or associated with the PDU session is a serving HPLMN S-NSSAI if PLMN X is a HPLMN, or is a mapped HPLMN S-NSSAI if PLMN X is a VPLMN.

In step S530, the UE receives a 5GSM reject message (e.g., PDU SESSION ESTABLISHMENT/MODIFICATION REJECT) from PLMN X, wherein the 5GSM reject message includes a back-off timer value, a re-attempt indicator which indicates that re-attempt in EPLMN is not allowed, and a 5GSM cause value:=#68 "not supported SSC mode".

In step S540, the UE ignores the back-off timer value and the re-attempt indicator, and evaluates the URSP rules (if available).

In step S550, the UE prevents itself from sending another 5GSM request message for the same DDN and the same (mapped) HPLMN S-NSSAI using the same SSC mode or an SSC mode which was not included in the Allowed SSC mode Information Element (IE) carried in the 5GSM reject message, until any of the following conditions is fulfilled: (1) the UE is registered to a new PLMN which was not in a list of equivalent PLMNs at the time when the 5GSM reject message was received; (2) an SSC mode which is used to access to the DNN and the HPLMN S-NSSAI is changed by the UE which subsequently requests a new SSC mode or no SSC mode; (3) the UE is switched off; and (4) a USIM is removed or an entry in a list of subscriber data for a current SNPN is updated.

In step S560, the UE moves from PLMN X to PLMN Y, and registers to PLMN Y which is in the EPLMN list at the time when the 5GSM reject message was received.

In step S570, the UE checks the following based on the determination of PLMN Y is a HPLMN or a VPLMN. The checking includes: (1) when PLMN Y is a HPLMN, check if the serving HPLMN S-NSSAI included in the 5GSM request message or associated with the PDU session matches the (mapped) HPLMN S-NSSAI associated with the back-off timer; (2) when PLMN Y is a VPLMN, check if the mapped HPLMN S-NSSAI included in the 5GSM request message or associated with the PDU session matches the (mapped) HPLMN S-NSSAI associated with the back-off timer.

In step S580, if the check result indicates a match, the UE prevents itself from sending another 5GSM request message for the same DDN and the same (mapped) HPLMN S-NSSAI using the same SSC mode or an SSC mode which was not included in the Allowed SSC mode IE, until any of the conditions described in step S550 is fulfilled While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, comprising:
receiving a 5G Session Management (5GSM) reject message from a mobile communication network by a User Equipment (UE), wherein the 5GSM reject message indicates a network rejection not due to congestion control;
associating a back-off timer with a serving Home Public Land Mobile Network (HPLMN) Single-Network Slice Selection Assistance Information (S-NSSAI) or a mapped HPLMN S-NSSAI based on a register of the UE, wherein the serving HPLMN S-NSSAI is a serving part of a complete S-NSSAI and the mapped HPLMN S-NSSAI is a mapped part of the complete S-NSSAI; and
preventing the UE from sending a 5GSM request message for the same HPLMN S-NSSAI that is associated with the back-off timer.

2. The method as claimed in claim 1, wherein the 5GSM reject message is associated with a Protocol Data Unit (PDU) session, and the serving HPLMN S-NSSAI is obtained from the serving part of the complete S-NSSAI associated with the PDU session when the UE is registered in a HPLMN.

3. The method as claimed in claim 1, wherein the 5GSM reject message is associated with a Protocol Data Unit (PDU) session, and the mapped HPLMN S-NSSAI is obtained from the mapped part of the complete S-NSSAI associated with the PDU session when the UE is registered in a Visited PLMN (VPLMN).

4. The method as claimed in claim 3, wherein the serving part comprises a VPLMN S-NSSAI.

5. The method as claimed in claim 1, wherein the 5GSM reject message is received when the UE is registered in a first PLMN, and the preventing of the UE from sending a 5GSM request message for the same HPLMN S-NSSAI is performed when the UE is registered in a second PLMN.

6. The method as claimed in claim 5, wherein the first PLMN and the second PLMN are a HPLMN and one Visited PLMN (VPLMN) in an Equivalent PLMN (EPLMN) list, respectively, or are one VPLMN in the EPLMN list and the HPLMN, respectively, or are a first VPLMN and a second VPLMN which is in an EPLMN list of the first VPLMN, respectively.

7. The method as claimed in claim 6, wherein the 5GSM reject message comprises a re-attempt indicator which indicates that re-attempt in an EPLMN is not allowed, or the 5GSM reject message does not comprise a re-attempt indicator.

8. The method as claimed in claim 1, wherein the 5GSM reject message is a PDU SESSION ESTABLISHMENT REJECT message or a PDU SESSION MODIFICATION REJECT message, and the 5GSM request message is a PDU SESSION ESTABLISHMENT REQUEST message or a PDU SESSION MODIFICATION REQUEST message.

9. A User Equipment (UE), comprising:
a wireless transceiver, configured to perform wireless transmission and reception to and from a mobile communication network; and
a controller, configured to receive a 5G Session Management (5GSM) reject message indicating a network rejection not due to congestion control from the mobile communication network via the wireless transceiver, associate a back-off timer with a serving Home Public Land Mobile Network (HPLMN) Single-Network Slice Selection Assistance Information (S-NSSAI) or a mapped HPLMN S-NSSAI based on a register of the UE, and prevent the UE from sending a 5GSM request message for the same HPLMN S-NSSAI that is associated with the back-off timer, wherein the serving HPLMN S-NSSAI is a serving part of a complete S-NSSAI and the mapped HPLMN S-NSSAI is a mapped part of the complete S-NSSAI.

10. The UE as claimed in claim 9, wherein the 5GSM reject message is associated with a Protocol Data Unit (PDU) session, and the serving HPLMN S-NSSAI is obtained from the serving part of the complete S-NSSAI associated with the PDU session when the UE is registered with a HPLMN.

11. The UE as claimed in claim 9, wherein the 5GSM reject message is associated with a Protocol Data Unit (PDU) session, and the mapped HPLMN S-NSSAI is obtained from the mapped part of the complete S-NSSAI associated with the PDU session when the UE is registered with a Visited PLMN (VPLMN).

12. The UE as claimed in claim 11, wherein the serving part comprises a VPLMN S-NSSAI.

13. The UE as claimed in claim 9, wherein the 5GSM reject message is received when the UE is registered in a first PLMN, and the preventing of the UE from sending a 5GSM request message for the same HPLMN S-NSSAI is performed when the UE is registered in a second PLMN.

14. The UE as claimed in claim 13, wherein the first PLMN and the second PLMN are a HPLMN and one Visited PLMN (VPLMN) in an Equivalent PLMN (EPLMN) list, respectively, or are one VPLMN in the EPLMN list and the HPLMN, respectively, or are a first VPLMN and a second VPLMN which is in an EPLMN list of the first VPLMN, respectively.

15. The UE as claimed in claim 14, wherein the 5GSM reject message comprises a re-attempt indicator which indicates that re-attempt in an EPLMN is not allowed, or the 5GSM reject message does not comprise a re-attempt indicator.

16. The UE as claimed in claim 9, wherein the 5GSM reject message is a PDU SESSION ESTABLISHMENT REJECT message or a PDU SESSION MODIFICATION REJECT message, and the 5GSM request message is a PDU SESSION ESTABLISHMENT REQUEST message or a PDU SESSION MODIFICATION REQUEST message.

17. A method, comprising:
sending a 5G Session Management (5GSM) request message to a mobile communication network by a User Equipment (UE), wherein the 5GSM request message is associated with a serving Home Public Land Mobile Network (HPLMN) Single-Network Slice Selection Assistance Information (S-NSSAI) or a mapped HPLMN S-NSSAI based on a register of the UE, wherein the serving HPLMN S-NSSAI is a serving part of a complete S-NSSAI, the mapped HPLMN S-NS- SAI is a mapped part of the complete S-NSSAI, and the serving HPLMN S-NSSAI or the mapped HPLMN S-NSSAI is associated with a back-off timer;

receiving a 5GSM reject message from the mobile communication network, wherein the 5GSM reject message indicates a network rejection not due to congestion control; and preventing the UE from sending another 5GSM request message for the same HPLMN S-NSSAI in response to the 5GSM reject message.

18. The method as claimed in claim 17, further comprising:

in response to the 5GSM reject message comprising a 5GSM cause value of #50 "PDU session type IPv4 only allowed", #51 "PDU session type IPv6 only allowed", #57 "PDU session type IPv4v6 only allowed", #58 "PDU session type Unstructured only allowed", or #61 "PDU session type Ethernet only allowed", preventing the UE from sending another 5GSM request message for the same HPLMN S-NSSAI until any of the following conditions is fulfilled:

the UE is registered to a new PLMN which was not in a list of equivalent PLMNs at the time when the 5GSM reject message was received;

the UE is registered to a new PLMN which was in a list of equivalent PLMNs at the time when the 5GSM reject message was received, and either the 5GSM reject message does not include a re-attempt indicator or the re-attempt indicator included in the 5GSM reject message indicates that re-attempt in an equivalent PLMN is allowed;

a PDU session type which is used to access to the HPLMN S-NSSAI is changed by the UE which subsequently requests a new PDU session type;

the UE is switched off; and a Universal Subscriber Identity Module (USIM) is removed or an entry in a list of subscriber data for a current Stand-alone Non-Public Network (SNPN) is updated.

19. The method as claimed in claim 17, further comprising:

in response to the 5GSM reject message comprising a 5GSM cause value of #68 "not supported SSC mode", preventing the UE from sending another 5GSM request message for the same HPLMN S-NSSAI until any of the following conditions is fulfilled:

the UE is registered to a new PLMN which was not in a list of equivalent PLMNs at the time when the 5GSM reject message was received;

a Session and Service Continuity (SSC) mode which is used to access to the DNN and the HPLMN S-NSSAI is changed by the UE which subsequently requests a new SSC mode or no SSC mode;

the UE is switched off; and a Universal Subscriber Identity Module (USIM) is removed or an entry in a list of subscriber data for a current Stand-alone Non-Public Network (SNPN) is updated.

20. The method as claimed in claim 17, wherein the 5GSM request message is a PDU SESSION ESTABLISHMENT REQUEST message or a PDU SESSION MODIFICATION REQUEST message, and the 5GSM reject message is a PDU SESSION ESTABLISHMENT REJECT message or a PDU SESSION MODIFICATION REJECT message.

* * * * *